US010970866B2

(12) United States Patent
Diankov et al.

(10) Patent No.: US 10,970,866 B2
(45) Date of Patent: Apr. 6, 2021

(54) SHAPE INFORMATION GENERATION APPARATUS, CONTROL APPARATUS, LOADING/UNLOADING APPARATUS, LOGISTICS SYSTEM, NON-TRANSITORY COMPUTER-READABLE MEDIUM, AND CONTROL METHOD

(71) Applicant: MUJIN, Inc., Tokyo (JP)

(72) Inventors: Rosen Diankov, Tokyo (JP); Xutao Ye, Tokyo (JP); Ziyan Zhou, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

(21) Appl. No.: 16/739,184

(22) Filed: Jan. 10, 2020

(65) Prior Publication Data

US 2020/0148489 A1   May 14, 2020

Related U.S. Application Data

(63) Continuation of application No. PCT/JP2019/023739, filed on Jun. 14, 2019.

(30) Foreign Application Priority Data

Oct. 15, 2018   (JP) ................................ 2018-194064

(51) Int. Cl.
*G06T 7/55* (2017.01)
*B65G 67/24* (2006.01)
(Continued)

(52) U.S. Cl.
CPC ............... *G06T 7/55* (2017.01); *B25J 9/0093* (2013.01); *B25J 9/1697* (2013.01); *B65G 59/02* (2013.01);
(Continued)

(58) Field of Classification Search
CPC .................................. G06T 7/55; B65G 67/02
See application file for complete search history.

(56) References Cited

U.S. PATENT DOCUMENTS 9,589,353 B2 * 3/2017 Halata .................. G06K 9/4652
9,754,413 B1 * 9/2017 Gray ..................... G06T 17/005
(Continued)

FOREIGN PATENT DOCUMENTS

CN        107871185 A      4/2018
JP        H06345270 A     12/1994
(Continued)

OTHER PUBLICATIONS

International Search Report and (ISA/237) Written Opinion of the International Search Authority for International Patent Application No. PCT/JP2019/023739, issued/mailed by the Japan Patent Office dated Sep. 12, 2019.
(Continued)

*Primary Examiner* — Thomas Randazzo
(74) *Attorney, Agent, or Firm* — Medler Ferro Woodhouse & Mills PLLC

(57) ABSTRACT

A control apparatus includes a first information acquiring section that acquires three-dimensional information of a first region of surfaces of a plurality of objects, the information being obtained by imaging or scanning the plurality of objects from a first location; a second information acquiring section that acquires three-dimensional information of a second region of surfaces of the plurality of objects, the information being obtained by imaging or scanning the plurality of objects from a second location; and a combining section that generates information indicating three-dimensional shapes of at least a portion of the surfaces of the plurality of objects, based on the three-dimensional information of the first region acquired by the first information acquiring section and the three-dimensional information of
(Continued)

the second region acquired by the second information acquiring section.

10 Claims, 13 Drawing Sheets

(51) Int. Cl.
*B65G 67/04* (2006.01)
*B65G 67/02* (2006.01)
*B25J 9/00* (2006.01)
*B25J 9/16* (2006.01)
*B65G 59/02* (2006.01)

(52) U.S. Cl.
CPC .............. *B65G 67/04* (2013.01); *B65G 67/24* (2013.01); *B65G 2201/0235* (2013.01); *B65G 2814/0311* (2013.01); *G06T 2207/10028* (2013.01)

(56) References Cited

U.S. PATENT DOCUMENTS

| | | | |
|---|---|---|---|
| 10,035,667 B2 | 7/2018 | Criswell | |
| 10,315,865 B2 | 6/2019 | Eto | |
| 2005/0151734 A1* | 7/2005 | Gubkin | G06T 9/001 345/424 |
| 2010/0185327 A1 | 7/2010 | Nakajima | |
| 2015/0009214 A1* | 1/2015 | Lee | G06T 17/20 345/420 |
| 2015/0352721 A1* | 12/2015 | Wicks | B25J 9/1664 700/228 |
| 2017/0116779 A1* | 4/2017 | Lalish | G06T 15/04 |
| 2017/0278298 A1* | 9/2017 | Hurter | G06T 19/003 |
| 2018/0290845 A1* | 10/2018 | McMurrough | G06T 7/10 |
| 2019/0098277 A1* | 3/2019 | Takama | G06T 17/00 |

FOREIGN PATENT DOCUMENTS

| | | |
|---|---|---|
| JP | H0797058 A | 4/1995 |
| JP | H07299782 A | 11/1995 |
| JP | 2007216350 A | 8/2007 |
| JP | 2012088114 A | 5/2012 |
| JP | 2016504983 A | 2/2016 |
| JP | 2016091053 A | 5/2016 |
| JP | 2016147330 A | 8/2016 |
| JP | 2017033429 A | 2/2017 |
| JP | 2017097847 A | 6/2017 |
| JP | 2017206318 A | 11/2017 |
| WO | 2016054656 A1 | 4/2016 |

OTHER PUBLICATIONS

Rakotovao Tinan et al "Multi-sensor fusion of occupancy grids based on integer arithmetic" 2016 IEEE Internaitonal Conference on Robotics and Automation(ICRA),IEEE,Stockholm Sweden, May 16-21, 2016, pp. 1854-1859.

Deceision of grant issued for counterpart Japanese Application No. 2018-194064, issued by the Japan Patent Office dated Jan. 29, 2019 (drafted on Jan. 22, 2019).

Deceision of grant issued for counterpart Japanese Application No. 2019-050259, issued by the Japan Patent Office dated Aug. 6, 2019 (drafted on Aug. 1, 2019).

Fetzner, Angelika et al., "A 3D Representation of Obstacles in the Robot's Reachable Area Considering Occlusions" (Conference ISR Robotik 2014).

Hornung, Armin et al., "OctoMap: an efficient probabilistic 3D mapping framework based on octrees", Auton Robot (2013).

Office Action in German Patent Application No. 11 2019 000 119.1 (drafted Dec. 2020, received Feb. 2021).

Office Action in Chinese Patent Application No. 2019 8000 2082.4 (drafted Oct. 2020, received Dec. 2020).

* cited by examiner

| VOXEL ID | POINT GROUP INFORMATION | | | | | | | | COMBINATION RESULT |
|---|---|---|---|---|---|---|---|---|---|
| | CAMERA ID | TIMING | EVALUATION | ... | CAMERA ID | TIMING | EVALUATION | | |
| V_001 | C_462 | *** | EMPTY | ... | C_468 | *** | UNKNOWN | | EMPTY |
| V_001 | C_462 | *** | OCCUPIED | ... | C_468 | *** | UNKNOWN | | OCCUPIED |
| ... | ... | ... | ... | ... | ... | ... | ... | | ... |

1120 ... 1140 ... 1160

| CONTAINER ID | PACKAGE ID | SIZE | | | SHAPE | FEATURE POINTS |
|---|---|---|---|---|---|---|
| | | x | y | z | | |
| P_001 | W_001 | ** cm | ** cm | ** cm | SQUARE PILLAR | *** |
| P_001 | W_002 | ** cm | ** cm | ** cm | CYLINDRICAL PILLAR | *** |
| ... | ... | ... | ... | ... | ... | ... |

*FIG. 13*

SHAPE INFORMATION GENERATION APPARATUS, CONTROL APPARATUS, LOADING/UNLOADING APPARATUS, LOGISTICS SYSTEM, NON-TRANSITORY COMPUTER-READABLE MEDIUM, AND CONTROL METHOD

CROSS REFERENCE TO RELATED APPLICATION

This is a continuation application of International Application No. PCT/JP2019/023739 filed on Jun. 14, 2019, which claims priority to Japanese Patent Application No. 2018-194064 filed in JP on Oct. 15, 2018, the contents of each of which are incorporated herein by reference.

BACKGROUND

1. Technical Field

The present invention relates to a shape information generation apparatus, a control apparatus, a loading/unloading apparatus, a logistics system, a non-transitory computer-readable medium, and a control method.

2. Related Art

A picking system is known that uses a picking hand and a robot arm to take out a workpiece housed in a container and arrange this workpiece at a specified location inside another container.

CITATION LIST

Patent Literature

[PTL1] Japanese Unexamined Patent Application Publication No. 2016-091053
[PTL2] Japanese Unexamined Patent Application Publication No. 2016-147330
[PTL3] Japanese Unexamined Patent Application Publication No. 2017-033429

BRIEF DESCRIPTION OF THE DRAWINGS

FIG. 11 schematically shows an example of the data table 1100.
FIG. 13 schematically shows an example of the data table 1300.

DESCRIPTION OF EXEMPLARY EMBODIMENTS

Figure 1:
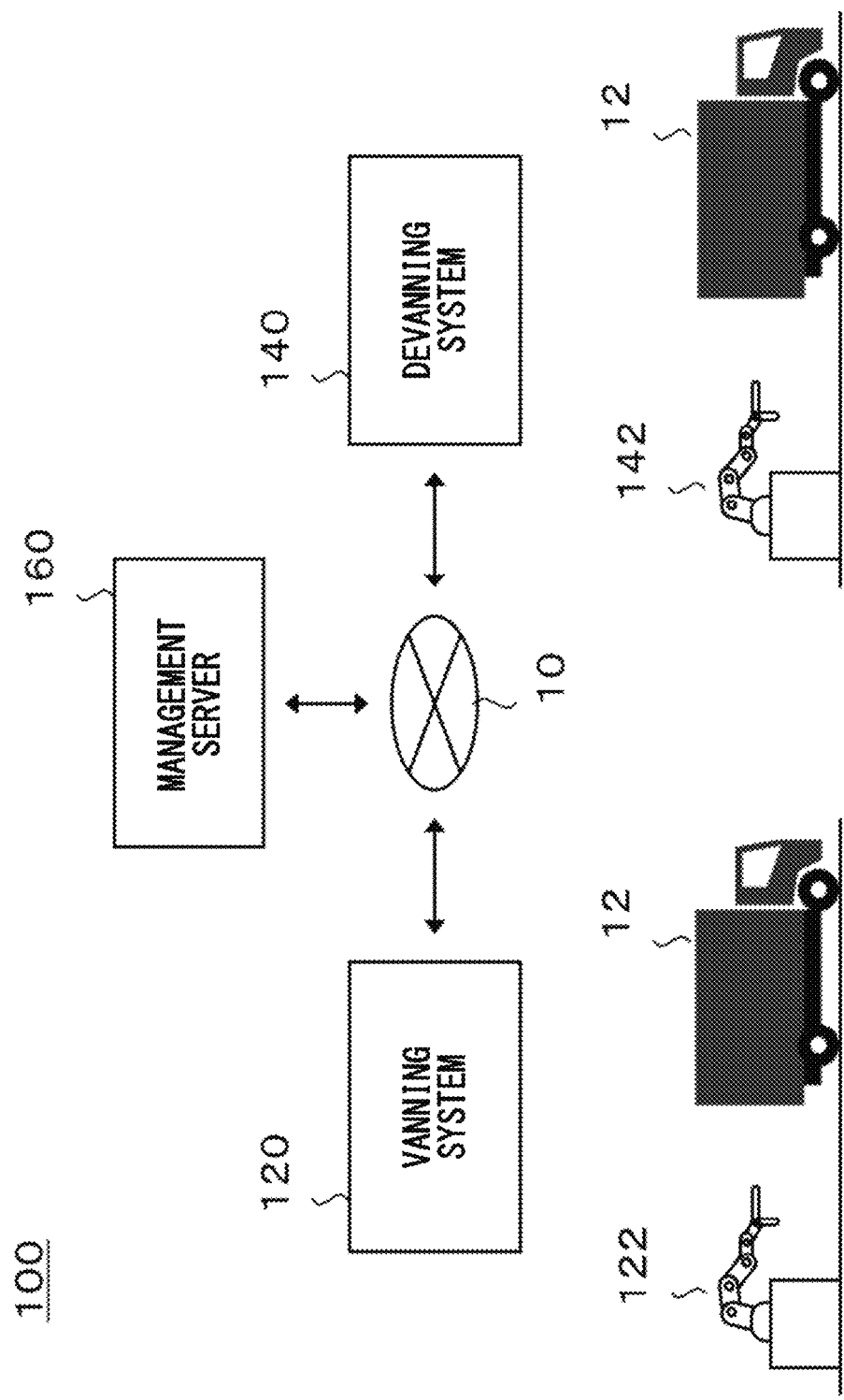
FIG. 1 schematically shows a system configuration of the logistics management system 100.

Hereinafter, some embodiments of the present invention will be described. The embodiments do not limit the invention according to the claims, and all the combinations of the features described in the embodiments are not necessarily essential to means provided by aspects of the invention. In the drawings, identical or similar portions may be given the same reference numerals, and redundant descriptions may be omitted.

[Schematic of the Logistics Management System 100]

FIG. 1 schematically shows a system configuration of the logistics management system 100. In the present embodiment, the logistics management system 100 includes a vanning system 120, a devanning system 140, and a management server 160. In the present embodiment, the vanning system 120 includes a loading/unloading system 122. In the present embodiment, the devanning system 140 includes a loading/unloading system 142.

The logistics management system 100 may be an example of a logistics system. The devanning system 140 may be an example of the logistics system. The loading/unloading system 122 may be an example of a loading/unloading apparatus and robot. The loading/unloading system 142 may be an example of the loading/unloading apparatus and robot. In this specification, the term "one or more" means "one or a plurality".

In the present embodiment, the vanning system 120 uses the loading/unloading system 122 to load one or more packages into a truck 12. For each of the one or more packages loaded in the truck 12, the vanning system 120 may acquire information concerning the size of the package. For each of the one or more packages loaded in the truck 12, the vanning system 120 may acquire information concerning a feature point for identifying the package. For each of the one or more packages loaded in the truck 12, the vanning system 120 may acquire information concerning the mass of the package.

The method by which the vanning system 120 acquires the information described above relating to each package is not particularly limited. In one embodiment, the information described above is input to a terminal of a shipper of the package or a terminal of a person or company that delivers the package, and the information is transmitted from this terminal to the vanning system 120 or the management server 160. In another embodiment, the information described above is acquired by a sensor arranged in the vanning system 120. This sensor may be a sensor for acquiring an image of the package or a group of points on the package surface. This sensor may be a sensor for acquiring the package mass.

The vanning system 120 transmits the information described above to the management server 160, via a communication network 10, for example. The details of the vanning system 120 are described further below.

In the present embodiment, the devanning system 140 uses the loading/unloading system 142 to unload one or more packages from the truck 12. For example, the devanning system 140 accesses the management server 160 via the communication network 10, and acquires from the management server 160 the information concerning the size of each of the one or more packages loaded in the truck 12. The devanning system 140 may acquire from the management server 160 the information concerning the feature point of each of the one or more packages loaded in the truck 12. The devanning system 140 may acquire from the management server 160 the information concerning the mass of each of the one or more packages loaded in the truck 12.

The devanning system 140 may use the various pieces of information acquired from the management server 160 to unload the one or more packages from the truck 12. The devanning system 140 may acquire the various pieces of information described above from the vanning system 120, the terminal of the shipper of the package, or the terminal of the person or company that delivers the package. The details of the devanning system 140 are described further below.

In the present embodiment, the management server 160 transmits and receives information between the vanning system 120 and the devanning system 140. For example, the management server 160 acquires information concerning cargo of the truck 12, from the vanning system 120. The management server 160 may store the information concerning the cargo of the truck 12 in a storage apparatus. The management server 160 may transmit the information concerning the cargo of the truck 12 to the devanning system 140, in response to a request from the devanning system 140, for example. The details of the management server 160 are described further below.

In the present embodiment, the communication network 10 may be a transmission path for wired communication, a transmission path for wireless communication, or a combination of a transmission path for wired communication and a transmission path for wireless communication. The communication network 10 may include a wireless packet communication network, the Internet, a P2P network, a dedicated line, a VPN, a power line communication line, or the like. The communication network 10 may include (i) a mobile communication network such as a mobile telephone network or (ii) a wireless communication network such as wireless MAN, wireless LAN, Bluetooth (Registered Trademark), Zigbee (Registered Trademark), or NFC (Near Field Communication). The wireless MAN may be WiMAX (Registered Trademark). The wireless LAN may be WiFi (Registered Trademark).

In the present embodiment, the details of the logistics management system 100 are described using an example in which the loading/unloading system 122 of the vanning system 120 loads the packages in the truck 12 and the loading/unloading system 142 of the devanning system 140 unloads the packages from the truck 12. However, the loading/unloading system 122 and the loading/unloading system 142 are not limited to the present embodiment. In another embodiment, at least one of the loading/unloading system 122 and the loading/unloading system 142 is configured to be able to perform both of the loading operation of loading the packages into the truck 12 and the unloading operation of unloading the packages from the truck 12.

[Detailed Configuration of each Section in the Logistics Management System 100]

Each section of the logistics management system 100 may be realized by hardware, by software, or by both hardware and software. At least part of each section of the logistics management system 100 may be realized by a single server or by a plurality of servers. At least part of each section of the logistics management system 100 may be realized on a virtual server or a cloud system. At least part of each section of the logistics management system 100 may be realized by a personal computer or a mobile terminal. The mobile terminal can be exemplified by a mobile telephone, a smart phone, a PDA, a tablet, a notebook computer, a laptop computer, a wearable computer, or the like. Each section of the logistics management system 100 may store information, using a distributed network or distributed ledger technology such as block chain.

If at least some of the components forming the logistics management system 100 are realized by software, these components realized by software may be realized by starting up programs in which operations corresponding to these components are defined, with an information processing apparatus having a general configuration. The information processing apparatus having the general configuration described above may include (i) a data processing apparatus having a processor such as a CPU or a GPU, a ROM, a RAM, a communication interface, and the like, (ii) an input apparatus such as a keyboard, a pointing device, a touch panel, a camera, an audio input apparatus, a gesture input apparatus, various sensors, or a GPS receiver, (iii) an output apparatus such as a display apparatus, an audio output apparatus, or a vibration apparatus, and (iv) a storage apparatus (including an external storage apparatus) such as a memory, an HDD, or an SSD. In the information processing apparatus having the general configuration described above, the data processing apparatus or the storage apparatus described above may store the programs described above. The programs described above cause the information processing apparatus described above to perform the operations defined by these programs, by being executed by the processor. The programs described above may be stored in a non-transitory computer readable storage medium. The programs described above may be stored in a computer readable medium such as a CD-ROM, a DVD-ROM, a memory, or a hard disk, or may be stored in a storage apparatus connected to a network.

The programs described above may cause a computer to function as a portion of or the entire logistics management system 100. The programs described above may include modules in which the operations of the sections of the logistics management system 100 are defined. These programs and modules act on the data processing apparatus, the input apparatus, the output apparatus, the storage apparatus, and the like to cause the computer to function as each section of the logistics management system 100 and to cause the computer to perform the information processing method in each section of the logistics management system 100. The programs described above may be installed in the computer forming at least part of the logistics management system 100, from the computer readable medium or the storage apparatus connected to the network. The computer may be caused to function as at least a portion of each section of the logistics management system 100, by executing the programs described above. By having the computer read the programs described above, the information processes recorded in these programs function as the specific means realized by the cooperation of software relating to these programs and various hardware resources of some or all of the logistics management system 100. These specific means realize computation or processing of the information corresponding to an intended use of the computer in the present embodiment, thereby forming the logistics management system 100 corresponding to this intended use.

The programs described above may be programs for causing the computer to perform the information processing methods of some or all of the logistics management system 100. In the present embodiment, the information processing method of some or all of the logistics management system 100 is a method for generating information indicating a three-dimensional shape of an object.

The information generation method described above includes a first information acquiring step of acquiring three-dimensional information of a first region of surfaces of a plurality of objects that are stacked, the information being obtained by imaging or scanning the plurality of objects from a first location, for example. The information generation method described above includes a second information acquiring step of acquiring three-dimensional information of a second region of surfaces of the plurality of objects, the information being obtained by imaging or scanning the plurality of objects from a second location, for example. The information generation method described above includes a combining step of generating information indicating three-dimensional shapes of at least a portion of the surfaces of the plurality of objects, based on the three-dimensional information of the first region acquired in the first information acquiring step and the three-dimensional information of the second region acquired in the second information acquiring step, for example. In the information generation method described above, the position of the first location and the position of the second location may be different from each other. In the information generation method described above, the combining step may include generating the information indicating the three-dimensional shapes of at least a portion of the surfaces of the plurality of objects by complementing one of the three-dimensional information of the first region and the three-dimensional information of the second region with the other.

In another embodiment, the information processing method of all or some of the logistics management system 100 may be a control method for controlling a robot. This robot unloads at least one object among a plurality of stacked objects, using a manipulator, for example The control method described above includes a first information acquiring step of acquiring three-dimensional information of a first region of surfaces of the plurality of objects, the information being obtained by imaging or scanning the plurality of objects from a first location, for example. The control method described above includes a second information acquiring step of acquiring three-dimensional information of a second region of surfaces of the plurality of objects, the information being obtained by imaging or scanning the plurality of objects from a second location, for example. The control method described above includes a combining step of generating information indicating three-dimensional shapes of at least a portion of the surfaces of the plurality of objects, based on the three-dimensional information of the first region acquired in the first information acquiring step and the three-dimensional information of the second region acquired in the second information acquiring step, for example. In the control method described above, the position of the first location and the position of the second location may be different from each other. In the control method described above, the combining step may include generating the information indicating the three-dimensional shapes of at least a portion of the surfaces of the plurality of objects by complementing one of the three-dimensional information of the first region and the three-dimensional information of the second region with the other.

Figure 2:
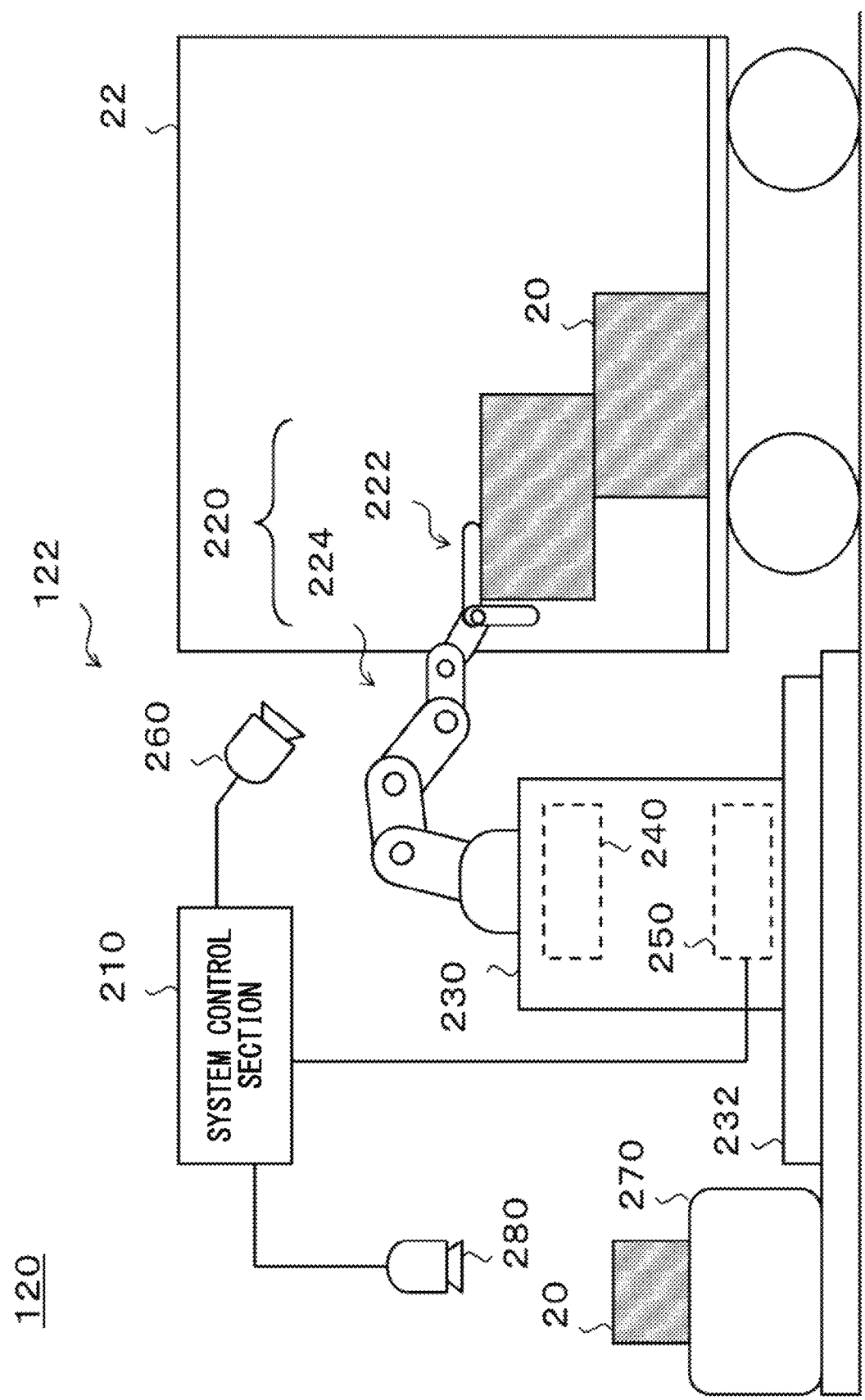
FIG. 2 schematically shows an example of an internal configuration of the vanning system 120.

FIG. 2 schematically shows an example of an internal configuration of the vanning system 120. In the present embodiment, the vanning system 120 includes the loading/unloading system 122 and a system control section 210 that controls the loading/unloading system 122. The vanning system 120 may include a conveyor 270 that transports packages 20. The vanning system 120 may include a three-dimensional camera 280 that images or scans the packages 20 transported by the conveyor 270.

In the present embodiment, the loading/unloading system 122 includes a manipulator 220, a platform 230, a rail 232, a drive section 240, and a drive control section 250. In the present embodiment, the manipulator 220 includes a robot hand 222 and a robot arm 224.

In the present embodiment, the loading/unloading system 122 uses the manipulator 220 to load at least one package 20 into a container 22 of the truck 12. The package 20 may be an example of an object.

As an example, first, the loading/unloading system 122 identifies the shape and current position of the package 20 transported thereto by the conveyor 270. For example, the loading/unloading system 122 obtains an image captured by the three-dimensional camera 280, and identifies the shape and current position of the package 20 based on this image. The three-dimensional camera 280 may acquire point group data or a depth image of the package 20.

Next, the loading/unloading system 122 determines the arrangement of the package 20 inside the container 22, based on the shape of the package 20. The arrangement of the package 20 is exemplified by the position and orientation of the package 20. For example, the loading/unloading system 122 may acquire information concerning the arrangement of the package 20 inside the container 22 from the management server 160. After this, the loading/unloading system 122 picks up the package 20 from the conveyor 270, and arranges the package 20 in a specified position inside the container 22.

The loading/unloading system 122 may include a single manipulator 220, or may include a plurality of manipulators 220. The loading/unloading system 122 may load a single package 20 using the single manipulator 220, or may load the single package 20 using a plurality of manipulators 220. The loading/unloading system 122 may load a plurality of packages 20 at once using the single manipulator 220.

In the present embodiment, the robot hand 222 of the manipulator 220 grips the package 20. The gripping method used by the robot hand 222 is not particularly limited. The gripping method used by the robot hand 222 can be exemplified by a method of holding the package 20 with suction caused by low pressure, a method of gripping the package 20 with a plurality of finger modules, and the like. The robot hand 222 may be replaced depending on the operation content. The robot hand 222 may include various sensors such as a touch sensor, a mass measuring sensor, and a load measuring sensor. The robot hand 222 may include a camera. This camera may include a three-dimensional camera that acquires a depth image or point group data. The three-dimensional camera may include a plurality of imaging elements. The three-dimensional camera may include a laser emission device for measurement.

In the present embodiment, the robot arm 224 of the manipulator 220 is connected to the robot hand 222, and adjusts the position and orientation of the robot hand 222. The structure of the robot arm 224 is not particularly limited, and a multi-jointed robot arm having a plurality of joints is used, for example. The robot arm 224 may include various sensors such as a mass measuring sensor and a load measuring sensor. The load measuring sensor may be a sensor that measures torque, a current value, or a voltage value of the drive section 240 that drives each joint of the robot arm 224.

In the present embodiment, the platform 230 supports the manipulator 220. The platform 230 may be a fixed platform, or may be a movable platform. In the present embodiment, the platform 230 can move on the rail 232, along an extension direction of the rail 232. In this way, the robot hand 222 can reach deep into the container 22. The platform 230 may house at least a portion of the drive section 240 therein. The platform 230 may house at least a portion of the drive control section 250 therein.

In the present embodiment, the drive section 240 drives the manipulator 220. In the present embodiment, the drive section 240 drives the robot hand 222. For example, the drive section 240 supplies the robot hand 222 with air and suctions air from the robot hand 222. The drive section 240 may be a pump. The drive section 240 may include one or more pumps. In another embodiment, the drive section 240 drives the robot arm 224. For example, the drive section 240 adjusts the angle of each joint of the robot arm 224. The drive section 240 may be a motor. The drive section 240 may include one or more motors.

In the present embodiment, the drive section 240 drives the platform 230. For example, the drive section 240 adjusts the relative positions of the container 22 and the platform 230. The drive section 240 may be a motor. The drive section 240 may include one or more motors.

The drive control section 250 controls the drive section 240. For example, the drive control section 250 receives a command for controlling the operation of the loading/unloading system 122 from the system control section 210. The drive control section 250 controls the drive section 240 based on the command from the system control section 210.

Figure 3:
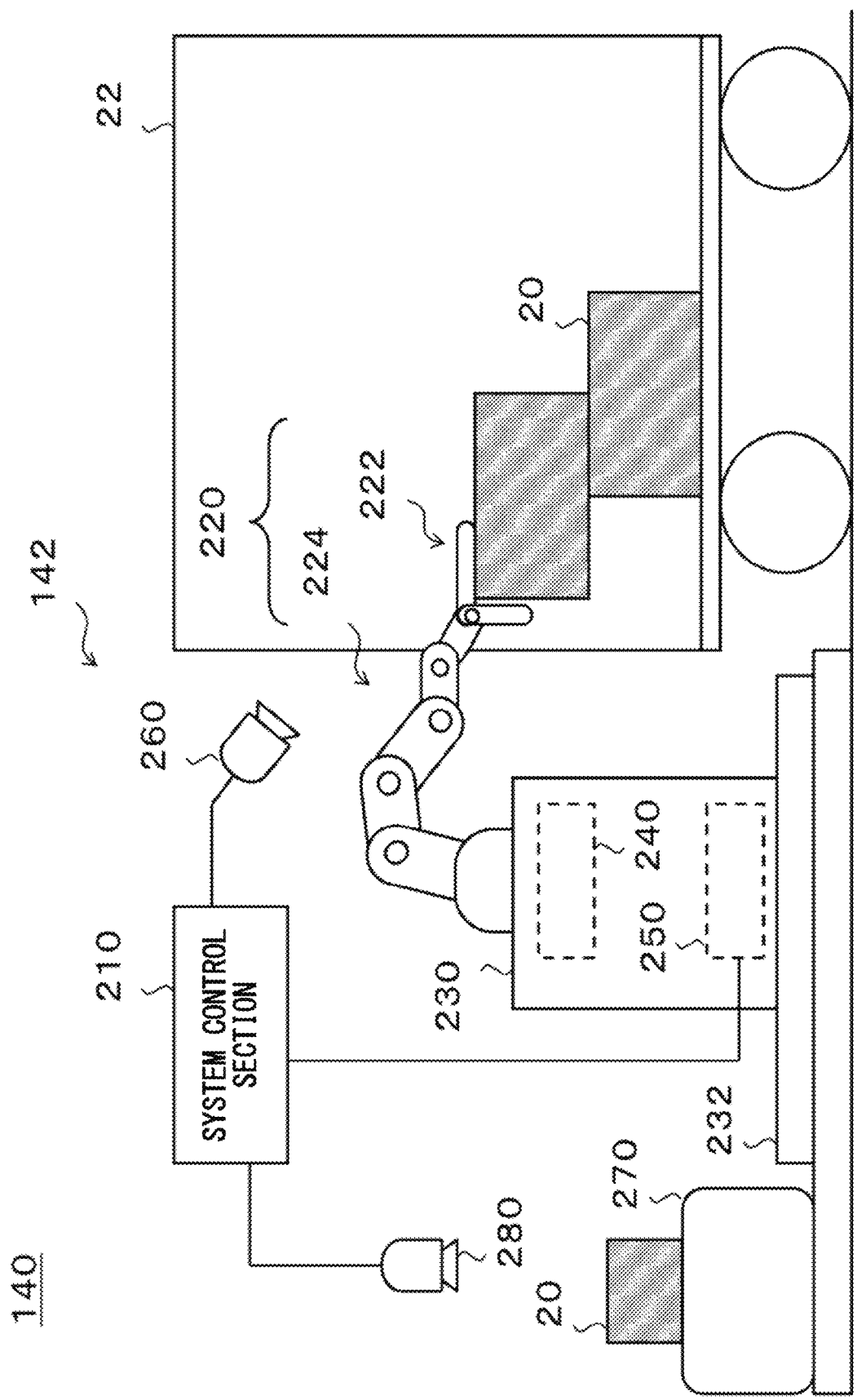
FIG. 3 schematically shows an example of an internal configuration of the devanning system 140.

The command for controlling the operation of the loading/unloading system 122 may be information indicating a trajectory of the robot hand 222. The information indicating the trajectory of the robot hand 222 can be exemplified by (i) information indicating an initial arrangement, transient arrangement, final arrangement, and movement time of the robot hand 222, (ii) information indicating an angle of each joint of the robot hand 222 in the initial arrangement, transient arrangement, final arrangement and the movement time of each joint, (iii) information indicating an arrangement of the robot hand 222 at each timing during movement, and (iv) information indicating an angle of each joint of the robot hand 222 at each timing during movement. The arrangement of the robot hand 222 is specified by the position and orientation of the robot hand 222, for example, FIG. 3 schematically shows an example of an internal configuration of the devanning system 140. In the present embodiment, the devanning system 140 includes the loading/unloading system 142 and the system control section 210 that controls the loading/unloading system 142. The devanning system 140 may include the conveyor 270 that transports the packages 20. The devanning system 140 may include the three-dimensional camera 280 that images or scans the packages 20 transported by the conveyor 270.

In the present embodiment, the loading/unloading system 142 includes the manipulator 220, the platform 230, the rail 232, the drive section 240, and the drive control section 250. In the present embodiment, the manipulator 220 includes the robot hand 222 and the robot arm 224.

The system control section 210 may be an example of a shape recognition apparatus and a control apparatus. The drive control section 250 may be an example of a shape recognition apparatus and a control apparatus.

In the present embodiment, the loading/unloading system 142 unloads at least one package 20 from among the plurality of packages 20 stacked inside the container 22 of the truck 12. The loading/unloading system 142 arranges the packages 20 unloaded from the container 22 on the conveyor 270, for example.

The loading/unloading system 142 may include the single manipulator 220, or may include a plurality of manipulators 220. The loading/unloading system 142 may unload a single package 20 using the single manipulator 220, or may unload a single package 20 using a plurality of manipulators 220. The loading/unloading system 142 may unload a plurality of packages 20 at once using the single manipulator 220.

Each section of the loading/unloading system 142 may have the same configuration as the corresponding section of the loading/unloading system 122. The details of the loading/unloading system 142 are described further below. Each section of the loading/unloading system 122 may have the same configuration as the corresponding section of the loading/unloading system 142, as long as this does not cause a technical contradiction.

In the present embodiment, the system control section 210 controls the loading/unloading system 142. The details of the system control section 210 are described further below. The system control section 210 of the loading/unloading system 122 may have the same configuration as the system control section 210 of the loading/unloading system 142, as long as this does not cause a technical contradiction.

Figure 4:
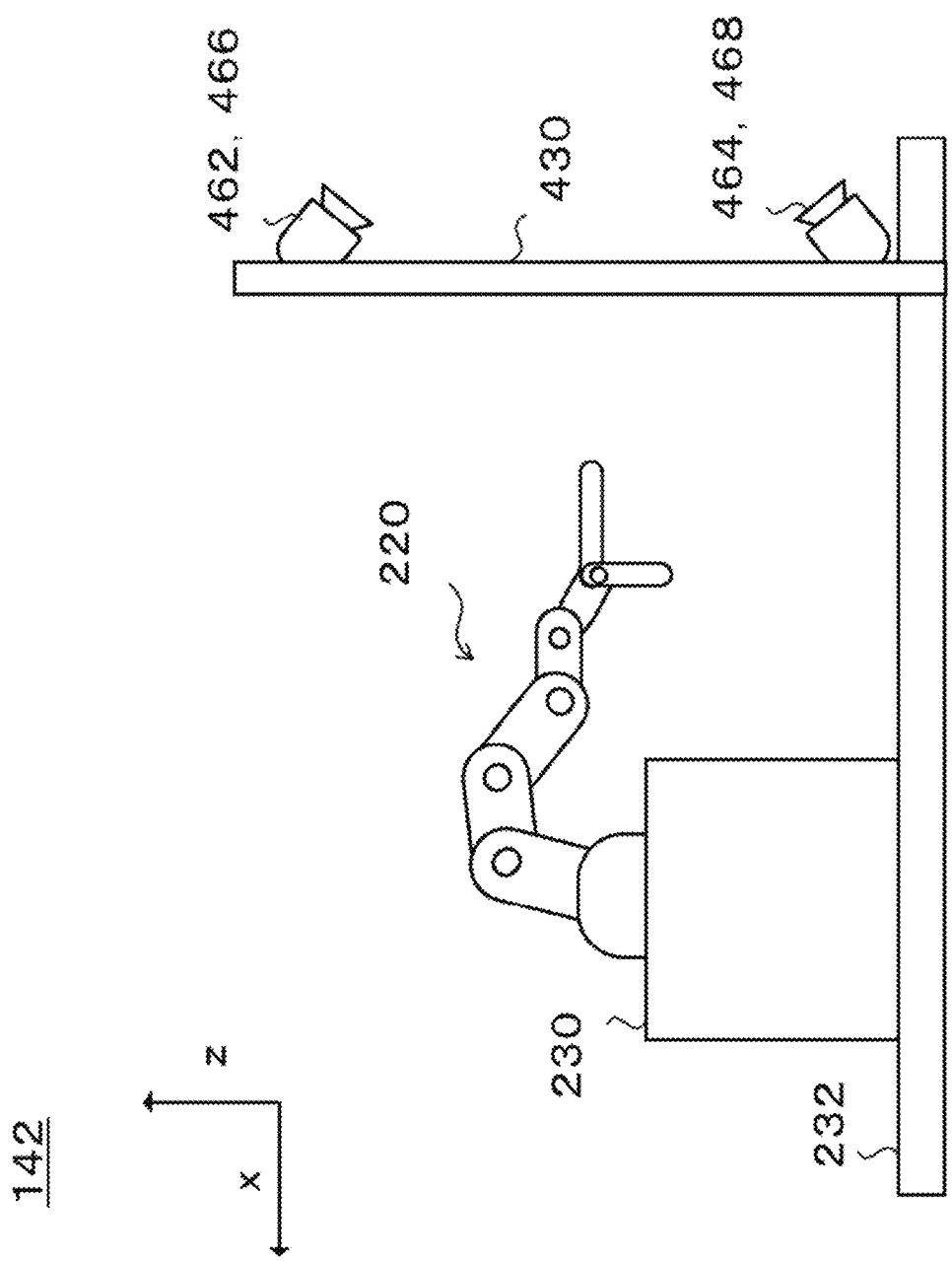
FIG. 4 schematically shows an example of a system configuration of the loading/unloading system 142.
Figure 5:
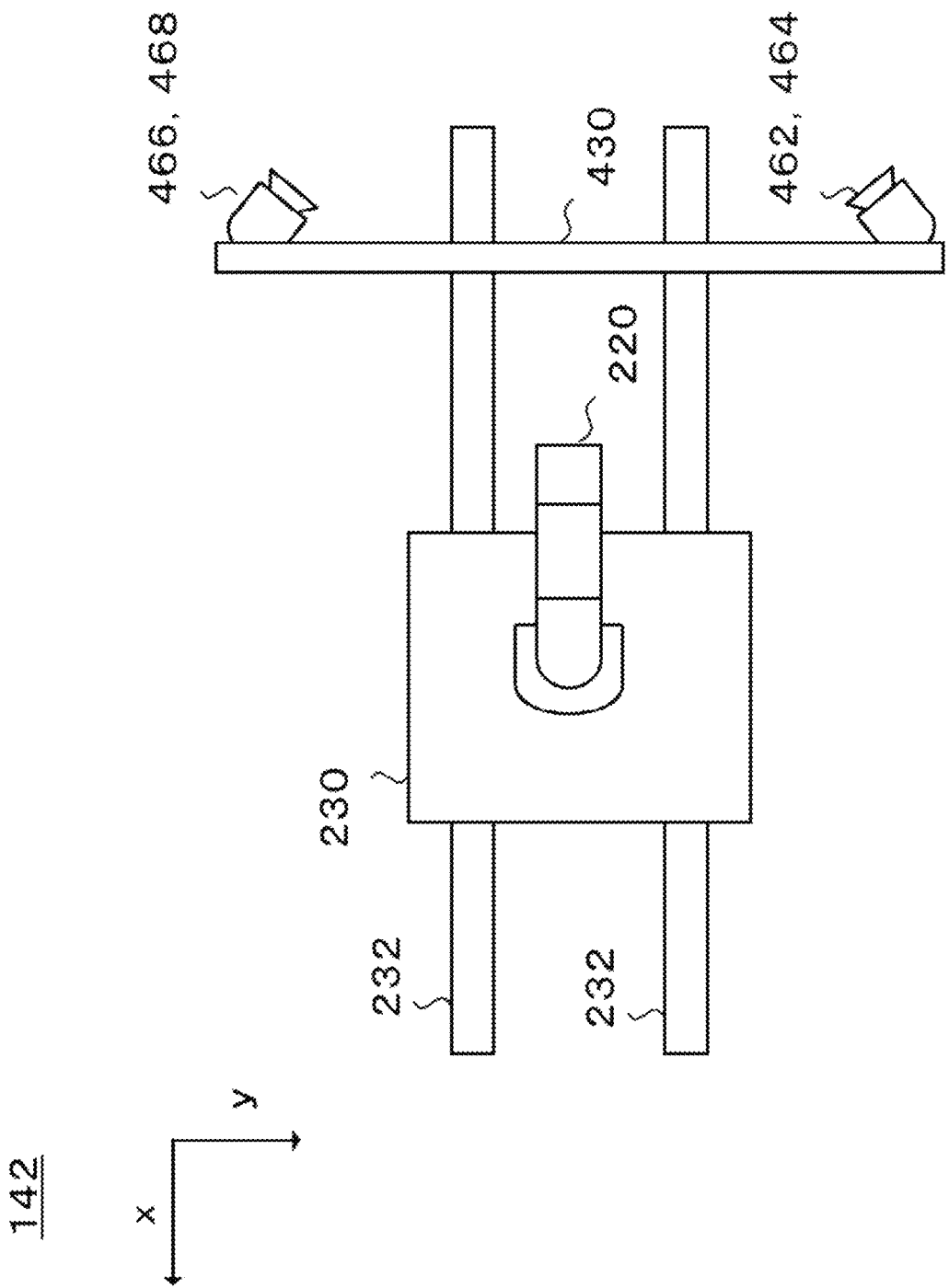
FIG. 5 schematically shows an example of a system configuration of the loading/unloading system 142.

An example of the system configuration of the loading/unloading system 142 is described using FIGS. 4 and 5. FIG. 4 schematically shows an example of a side view of the loading/unloading system 142. FIG. 5 schematically shows an overhead view of the loading/unloading system 142.

According to the embodiment described in relation to FIGS. 4 and 5, the loading/unloading system 142 includes a three-dimensional camera 462, a three-dimensional camera 464, a three-dimensional camera 466, and a three-dimensional camera 468 as the three-dimensional camera 260. In the present embodiment, the three-dimensional camera 462, the three-dimensional camera 464, the three-dimensional camera 466, and the three-dimensional camera 468 are arranged at different positions on a stand 430.

One of the three-dimensional camera 462, the three-dimensional camera 464, the three-dimensional camera 466, and the three-dimensional camera 468 may be an example of a first information acquiring section. Another one of the three-dimensional camera 462, the three-dimensional camera 464, the three-dimensional camera 466, and the three-dimensional camera 468 may be an example of a second information acquiring section. Each position where a camera is arranged on the stand 430 may be an example of a first location or a second location.

The three-dimensional camera 462 images or scans the inside of the container 22 from an installation position of this camera. In this way, three-dimensional information concerning a partial region of the surfaces of the packages 20 stacked inside the container 22 is acquired. The three-dimensional information is exemplified by point group data, a depth image, or the like. The point group data may be a collection of three-dimensional coordinate values of measurement points. The three-dimensional camera 462 may acquire the three-dimensional information using a plurality of imaging elements. The three-dimensional camera 462 may have a laser emission function.

Similarly, the three-dimensional camera 464 images or scans the inside of the container 22 from an installation position of this camera. The three-dimensional camera 466 images or scans the inside of the container 22 from an installation position of this camera. The three-dimensional camera 468 images or scans the inside of the container 22 from an installation position of this camera. The three-dimensional camera 464, the three-dimensional camera 466, and the three-dimensional camera 468 may each have the same configuration as the three-dimensional camera 462.

Figure 6:
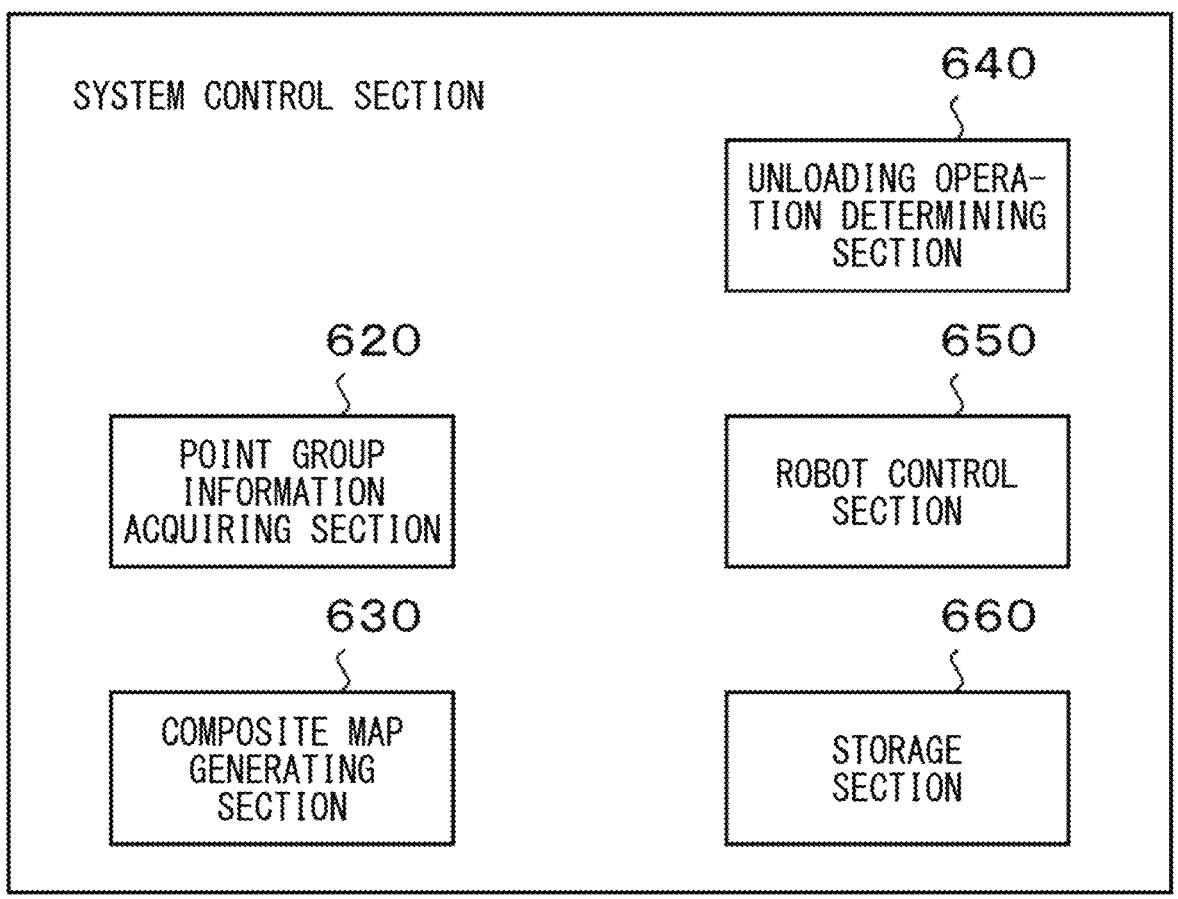
FIG. 6 schematically shows an example of an internal configuration of the system control section 210.

FIG. 6 schematically shows an example of an internal configuration of the system control section 210. In the present embodiment, the system control section 210 includes a point group information acquiring section 620, a composite map generating section 630, an unloading operation determining section 640, a robot control section 650, and a storage section 660.

The point group information acquiring section 620 may be an example of the first information acquiring section and the second information acquiring section. The composite map generating section 630 may be an example of a combining section. The unloading operation determining section 640 may be an example of an unloading target determining section and an unloading direction determining section.

In the present embodiment, the point group information acquiring section 620 acquires the information acquired by each of the three-dimensional camera 462, the three-dimensional camera 464, the three-dimensional camera 466, and the three-dimensional camera 468 imaging or scanning the inside of the container 22. For example, the point group information acquiring section 620 acquires point group data of the inside of the container 22 acquired by each of the three-dimensional camera 462, the three-dimensional camera 464, the three-dimensional camera 466, and the three-dimensional camera 468.

In this way, the point group information acquiring section 620 can acquire a plurality of sets of point group data relating to the surfaces of the plurality of packages 20 stacked inside the container 22. The pieces of point group data in the plurality of sets can be acquired by imaging or scanning parts of the surfaces of the plurality of the packages 20 respectively from different locations.

Workpieces housed in a container are mainly imaged or scanned from above, by a small workpiece picking apparatus. Furthermore, the robot hand of the picking apparatus approaches this workpiece from above. In contrast to this, according to the present embodiment, the plurality of packages 20 that are stacked in the up-down direction are mainly imaged or scanned from the side. Furthermore, the robot hand 222 approaches the packages 20 from the side.

In the present embodiment, the composite map generating section 630 generates one piece of point group data (sometimes referred to as composite point group data) indicating the state of the inside of the container 22, based on the plurality of sets of point group data indicating the state of the inside of the container 22 that are acquired by the point group information acquiring section 620. The composite map generating section 630 may generate the composite point group data by complementing one set of point group data with other sets of point group data, among the plurality of sets of point group data. The composite map generating section 630 may generate the composite point group data based on a plurality of sets of point group data obtained by removing pieces of the point group data relating to the surface of the manipulator 220 from the plurality of sets of point group data.

The three-dimensional shapes of at least portions of the surfaces of the plurality of packages 20 inside the container 22 are shown by the composite point group data. For example, the composite point group data shows (i) the three-dimensional shapes of portions of the top surfaces of the packages 20 and (ii) the three-dimensional shapes of side surfaces of the plurality of packages 20 on the side from which the unloading is performed.

The composite map generating section 630 may generate a three-dimensional map showing a portion of the surface shapes of the plurality of packages 20 or a positon of the surface shapes inside the container 22, based on (i) the plurality of sets of point group data or (ii) the composite point group data generated using the plurality of sets of point group data. For example, the composite map generating section 630 generates map information (also referred to as a composite depth map) in which (a) "occupied" information, (b) "empty" information, or (c) "unknown" information is associated with each of a plurality of voxels set virtually inside the container 22.

The (a) "occupied" information may be information indicating the presence of a point group corresponding to a portion of a surface of a package 20 within the voxel. In this way, it is shown that a portion of the surface of the package 20 is present at this voxel position. The (b) "empty" information may be information indicating that a point group corresponding to a portion of a surface of the package 20 is not present within the voxel. The "empty" information may be information indicating that a point group is not present within the voxel. In this way, it is shown that a portion of a surface of the package 20 is not present at this voxel location. The (c) "unknown" information is information indicating that it is unknown whether a point group corresponding to a portion of a surface of the package 20 is not present within the voxel. In this way, it is shown that it is unknown whether a portion of a surface of the package 20 is present at this voxel position.

Packages with different sizes are included among the plurality of packages 20 stacked inside the container 22. Therefore, due to the unevenness of the surfaces of the plurality of packages 20, it is possible for there to be a region among the surfaces of the plurality of packages 20 where the point group data cannot be obtained by a single three-dimensional camera. Furthermore, each three-dimensional camera of the loading/unloading system 122 images or scans the inside of the container 22 not only when the manipulator 220 is positioned outside the container 22, but also while the manipulator 220 is performing the operation of unloading the packages 20 arranged inside the container 22. Therefore, since the manipulator 220 appears in the viewing angle of each three-dimensional camera, it is possible for there to be a region among the surfaces of the plurality of packages 20 where the point group data cannot be acquired by a single three-dimensional camera.

According to the present embodiment, the composite map generating section 630 combines the plurality of sets of point group data obtained by the imaging or scanning from different locations, to generate the composite point group data indicating the three-dimensional shapes of at least portions of the surfaces of the plurality of packages 20. In this way, the system control section 210 can control the loading/unloading system 142 based on the point group data relating to a wider region of the surfaces of the plurality of packages 20, for example.

In the present embodiment, in order to simplify the description, the details of the composite map generating section 630 are described using an example in which the composite point group data is generated by the composite map generating section 630 based on the point group data obtained by the three-dimensional camera 462 and the point group data acquired by the three-dimensional camera 466. However, the composite map generating section 630 is not limited to the present embodiment. In another embodiment, the composite map generating section 630 may generate the composite point group data based on the plurality of sets of point group data obtained by another combination of three-dimensional cameras among the four three-dimensional cameras. The composite map generating section 630 may generate the composite point group data based on three or more sets of point group data.

[Combining of the Plurality of Pieces of Point Group Data]

As an example, the composite map generating section 630 acquires the point group data acquired by the three-dimensional camera 462 and the point group data acquired by the three-dimensional camera 466. In one embodiment, the composite map generating section 630 generates the composite point group data by complementing one of the point group data acquired by the three-dimensional camera 462 and the point group data acquired by the three-dimensional camera 466 with other point group data.

In another embodiment, the composite map generating section 630 removes point group data relating to the surface of the manipulator 220 from the point group data acquired by the three-dimensional camera 462. The composite map generating section 630 removes point group data relating to the surface of the manipulator 220 from the point group data acquired by the three-dimensional camera 466. In one embodiment, the composite map generating section 630 removes specified point group data by deleting, erasing, or excluding this specified point group data. In another embodiment, the composite map generating section 630 removes the point group data by overwriting distance information included in the specified point group data with information indicating that the distance is unknown.

Next, the composite map generating section 630 generates the composite point group data by complementing one of (i) the point group data acquired by the three-dimensional camera 462 from which the point groups relating to the surface of the manipulator 220 have been removed and (ii) the point group data acquired by the three-dimensional camera 466 from which the point groups relating to the surface of the manipulator 220 have been removed, with the other. The complementation process is performed according to the procedure described below, for example.

According to the present embodiment, the composite map generating section 630 acquires, from the storage section 660, information indicating the relative positions of the three-dimensional camera 462 and the three-dimensional camera 466 in three-dimensional space, relative to an arbitrary position of the loading/unloading system 142 (sometimes referred to as a reference position). The point group data acquired by the three-dimensional camera 462 indicates the angle and distance, from the three-dimensional camera 462, of each point on the surface of an object inside the container 22, for example. The point group data acquired by the three-dimensional camera 466 indicates the angle and distance, from the three-dimensional camera 466, of each point on the surface of an object inside the container 22, for example.

The composite map generating section 630 calculates the positions of points indicated by each piece of point group data acquired by the three-dimensional camera 462 and the positions of points indicated by each piece of point group data acquired by the three-dimensional camera 466, based on the point group data acquired by the three-dimensional camera 462, the point group data acquired by the three-dimensional camera 466, and the information described above indicating the relative positions of the three-dimensional camera 462 and the three-dimensional camera 466.

The composite map generating section 630 compares the positions of the points indicated by each piece of point group data acquired by the three-dimensional camera 462 and the positions of the points indicated by each piece of point group data acquired by the three-dimensional camera 466. The composite map generating section 630 generates the composite point group data, based on the comparison results, by combining or merging (i) the point group data acquired by the three-dimensional camera 462, from which the point groups relating to the surface of the manipulator 220 have been removed and (ii) the point group data acquired by the three-dimensional camera 466 from which the point groups relating to the surface of the manipulator 220 have been removed, which is point group data indicating the points that are different from the points indicated by the point group data acquired by the three-dimensional camera 462.

[Generation of the Composite Depth Map]

As an example, the composite map generating section 630 acquires the point group data acquired by the three-dimensional camera 462 and the point group data acquired by the three-dimensional camera 466. The composite map generating section 630 may generate a first depth map in which (a) the "occupied" information, (b) the "empty" information, and (c) the "unknown" information are associated with each of the plurality of voxels virtually set within the container 22, based on the point group data acquired by the three-dimensional camera 462. The composite map generating section 630 may generate a second depth map in which (a) the "occupied" information, (b) the "empty" information, and (c) the "unknown" information are associated with each of the plurality of voxels virtually set within the container 22, based on the point group data acquired by the three-dimensional camera 466.

The composite map generating section 630 may generate the composite depth map in which (a) the "occupied" information, (b) the "empty" information, and (c) the "unknown" information are associated with each of the plurality of voxels by complementing one of the first depth map and the second depth map with the other. For example, the composite map generating section 630 generates the composite depth map by combining or merging the information of the first depth map with the information of the second depth map, for each of the plurality of voxels virtually set within the container 22.

The inside of the container 22 may be an example of a work space of the loading/unloading system 142. The first depth map may be an example of first map information. The second depth map may be an example of second map information. The composite depth map may be an example of composite map information.

In another embodiment, the composite map generating section 630 may generate the first depth map after the point groups relating to the surfaces of the manipulator 220 have been removed from the point group data acquired by the three-dimensional camera 462. The composite map generating section 630 may generate the second depth map after the point groups relating to the surfaces of the manipulator 220 have been removed from the point group data acquired by the three-dimensional camera 466.

In another embodiment, the composite map generating section 630 may generate the first depth map based on the point group data, at a plurality of time points, acquired by the three-dimensional camera 462. The composite map generating section 630 may generate the second depth map based on the point group data, at a plurality of time points, acquired by the three-dimensional camera 466.

As an example, there is a case where the number of point groups relating to the surface of the package 20 is significantly reduced when the group points relating to the surface of the manipulator 220 are removed from the point group data acquired by the three-dimensional camera 462 at a timing t2. Therefore, the composite map generating section 630 uses the point group data acquired by the three-dimensional camera 462 at the timing t1, which is before the timing t2, to complement the point group data acquired by the three-dimensional camera 462 at the timing t2. As a specific example, the composite map generating section 630 replaces at least part of the "unknown" information of the first depth map generated based on the point group data acquired at the timing t2 by the three-dimensional camera 462 with the "occupied" information or the "empty" information, based on the point group data acquired by the three-dimensional camera 462 at the timing t1.

In another embodiment, the composite map generating section 630 may generate the first depth map based on the point group data, at one or more time points, acquired by the three-dimensional camera 462. The composite map generating section 630 may generate the second depth map based on the point group data, at one or more time points, acquired by the three-dimensional camera 466.

In a case where the composite map generating section 630 generates the composite depth map based on the first depth map and the second depth map, it is possible that the data of the first depth map and the data of the second depth map will be different for the same voxel. Furthermore, it is possible that the data of the first depth map at a first timing and the data of the first depth map at a second timing will be different for the same voxel. Similarly, it is possible that the data of the second depth map at a third timing and the data of the second depth map at a fourth timing will be different for the same voxel.

Therefore, according to one embodiment, the composite map generating section 630 generates the composite depth map using the temporally newer information. In another embodiment, the composite map generating section 630 may generate the composite depth map using the information obtained by the three-dimensional camera closer to the installation position of the manipulator 220.

In the present embodiment, a case is described in which the composite depth map is generated based on the first depth map and the second depth map. However, the method for generating the composite depth map is not limited to this. In another embodiment, the composite map generating section 630 acquires the point group data acquired by the three-dimensional camera 462 and the point group data acquired by the three-dimensional camera 466. The composite map generating section 630 then generates the composite point group data based on the point group data acquired by the three-dimensional camera 462 and the point group data acquired by the three-dimensional camera 466. The composite map generating section 630 may generate the composite depth map based on the composite point group data.

In the present embodiment, the unloading operation determining section 640 determines the content of the operation performed by the manipulator 220. For example, the unloading operation determining section 640 determines the package 20 to serve as the target for the unloading operation of the manipulator 220. The unloading operation determining section 640 may determine an unloading direction in which the package 20 determined to be the target of the unloading operation is to be unloaded. In a case where the at least one of the package 20 to be the target of the unloading operation and the unloading direction of the package 20 cannot be determined, the unloading operation determining section 640 may transmit information indicating this fact to a manager of the logistics management system 100 or a user of a terminal.

Generally, the closer that the package 20 is arranged to the installation position of the manipulator 220 in the container 22 (sometimes referred to as unloading opening side of the container 22), the greater the amount of information that can be obtained via the three-dimensional camera 260. Furthermore, the farther upward the package 20 is positioned, the greater the amount of information that can be obtained via the three-dimensional camera 260. Therefore, the unloading operation determining section 640 selects the package 20 that is positioned on the topmost surface and closest to the unloading opening side of the container 22 to be the target of the unloading operation, for example, and unloads the selected package 20 from the unloading opening side of the container 22. However, the determination of the unloading target and the determination of the unloading direction are not limited to the present embodiment.

In one example, the unloading operation determining section 640 determines the package 20 to be the target of the unloading operation based on the positional relationship of the plurality of stacked packages 20. The unloading operation determining section 640 may determine the package 20 to be the target of the unloading operation based on the positional relationship, in the up-down direction, of the plurality of stacked packages 20. For example, the unloading operation determining section 640 determines the package 20 to be the target of the unloading operation such that the packages 20 arranged farther upward are prioritized to be the target of the unloading operation. The unloading operation determining section 640 may compare the packages positioned near the center and determine the package 20 to be the target of the unloading operation while prioritizing packages 20 arranged below the center to be the targets of the unloading operation. The order of priority may be set such that the packages 20 arranged at a topmost surface are given highest priority, or set such that the packages 20 arranged at positions other than the topmost surface are given highest priority.

The unloading operation determining section 640 may determine the package 20 to be the target of the unloading operation based on the positional relationship, in a depth direction of the container 22, of the plurality of stacked packages 20. For example, the unloading operation determining section 640 determines the package 20 to be the target of the unloading operation such that that packages 20 arranged closer to the unloading opening side of the container 22 are prioritized to be the target of the unloading operation. The order of priority may be set such that packages 20 arranged closest to the unloading opening side of the container 22 are given highest priority, or set such that the packages 20 arranged in a specified region in the container 22 are given highest priority.

Next, the unloading operation determining section 640 determines the unloading direction of the package 20 set as the target of the unloading operation. The unloading direction of the package 20 is not particularly limited.

The unloading direction of the package 20 may be upward in a vertical direction or may be a direction substantially parallel to the horizontal direction. The unloading direction of the package 20 may be inclined relative to the vertical direction or the horizontal direction. The unloading direction of the package 20 may be substantially parallel to the depth direction of the container 22 (the left-right direction of FIG.

3), or may be substantially parallel to the width direction of the container 22 (the direction perpendicular to the plane of the drawing of FIG. 3). The unloading direction of the package 20 may be inclined relative to the depth direction or the width direction of the container 22. The unloading direction of the package 20 may be substantially parallel to a longitudinal direction of the package 20, or may be substantially parallel to a transverse direction of the package 20. The unloading direction of the package 20 may be substantially parallel to the longitudinal direction or the transverse direction of the package 20.

Referring to the unloading direction as "upward" includes not only a case where the unloading direction is vertical, but also a case where the angle formed between the unloading direction and the vertical direction is less than 90 degrees. The angle formed between the unloading direction and the vertical direction may be less than or equal to 60 degrees, or may be less than or equal to 45 degrees. Furthermore, the unloading direction being the "depth direction" or the "width direction", or being along the "depth direction" or the "width direction", includes not only a case where the unloading direction is parallel to the horizontal direction, but also a case where the angle formed between the unloading direction and the horizontal direction is less than 90 degrees. The angle formed between the unloading direction and the horizontal direction may be less than or equal to 60 degrees, or may be less than or equal to 45 degrees.

In a case where there are a plurality of candidates for the unloading direction of the package 20, the unloading operation determining section 640 may determine whether there is a path through which the package 20 can be unloaded (sometimes referred to as an unloading path) without the package 20 that is the target of the unloading operation and the manipulator 220 running into another package 20 or the walls of the container 22. The unloading operation determining section 640 may calculate an index indicating the certainty of the determination result relating to the presence or lack of the unloading path. The unloading operation determining section 640 may estimate the time needed for the unloading operation when unloading the package 20 along each unloading path.

The unloading operation determining section 640 may determine a candidate capable of establishing an unloading path, among the plurality of candidates for the unloading direction of the package 20, to be the unloading direction. If there are two or more candidates capable of establishing an unloading path, the unloading operation determining section 640 may determine the candidate corresponding to the unloading path with a higher certainty, based on the index indicating the certainty of the determination result described above, to be the unloading direction. The unloading operation determining section 640 may determine the candidate that has the shortest time needed for the unloading operation and can establish an unloading path, among the plurality of candidates relating to the unloading direction of the package 20, to be the unloading direction.

The unloading operation determining section 640 determines the unloading direction of the package 20 based on the positional relationship of the plurality of stacked packages 20, for example. The unloading operation determining section 640 may determine the unloading direction of the package 20 based on the positional relationship, in the up-down direction, of the plurality of stacked packages 20. For example, when unloading the package 20 arranged on the topmost surface, the unloading operation determining section 640 makes a determination to unload the package 20 by extracting the package 20 upward. When unloading the package 20 arranged at a position below the center, the unloading operation determining section 640 may make a determination to unload this package 20 by extracting the package 20 toward the side of the manipulator 220 or by extracting the package 20 along the width direction of the container 22.

The unloading operation determining section 640 may determine the unloading direction of the package 20 based on the positional relationship, in the depth direction of the container 22, of the plurality of stacked packages 20. For example, when unloading the package 20 positioned closest to the unloading opening side of the container 22, the unloading operation determining section 640 makes a determination to unload the package 20 by extracting the package 20 toward the unloading opening side. In a case where another package 20 is present between the package 20 that is the target of the unloading operation and the unloading opening side of the container 22, the unloading operation determining section 640 makes a determination to unload the package 20 by extracting the package 20 upward or extracting the package 20 along the width direction of the container 22.

In the present embodiment, the details of the unloading operation determining section 640 are described using an example in which at least one of the package 20 to be the target of the unloading operation and the unloading direction of the package 20 is determined based on the positional relationship of the plurality of stacked packages 20. However the unloading operation determining section 640 is not limited to the present embodiment.

In another embodiment, the unloading operation determining section 640 may determine at least one of the package 20 to be the target of the unloading operation and the unloading direction of the package 20 based on the sizes of the packages 20. For example, the unloading operation determining section 640 determines the package 20 to be the target of the unloading operation such that the packages 20 with smaller sizes, among the plurality of packages 20 positioned at the topmost surface of each of a plurality of rows or columns, are prioritized to be the target of the unloading operation. The unloading operation determining section 640 may determine the package 20 to be the target of the unloading operation such that the packages 20 with sizes in a specified range, among the plurality of packages 20 positioned at the topmost surface of each of a plurality of rows or columns, are prioritized to be the target of the unloading operation.

The unloading operation determining section 640 may determine whether to select a certain package 20 as the unloading target based on the size of this package 20 and the size of another package 20 positioned closer than this package 20 to the unloading opening. The other package 20 may be the package 20 arranged in the same column as the certain package 20, or may be the package 20 arranged in a different column than the certain package 20.

For example, when a large package 20 is positioned near the unloading opening of the container 22, it is possible to conceive of a case where this large package 20 interferes with the operation of the manipulator 220 unloading another package 20 or the operation of the three-dimensional camera 260 imaging or scanning the inside of the container 22. Therefore, in a case where the size of a certain package 20 is larger than the size of another package 20, the unloading operation determining section 640 makes a determination to select the certain package 20 as the unloading target. In this way, the larger package 20 is unloaded first. As a result, the time needed to unload the plurality of packages 20 loaded in the container 22 is reduced. Furthermore, the dead angle of the three-dimensional camera 260 caused by the package 20 described above is eliminated, and the content of the composite depth map or the composite point group data is improved.

In another embodiment, the unloading operation determining section 640 acquires information concerning the size of each of the plurality of packages 20 loaded in the container 22, from the management server 160. The unloading operation determining section 640 may determine at least one of the package 20 to be the target of the unloading operation and the unloading direction of the package 20 based on the composite depth map or the composite point group data of the plurality of packages 20 and the information concerning the size of each of the plurality of packages 20.

For example, the unloading operation determining section 640 analyzes the composite depth map or the composite point group data of the plurality of packages 20, and detects at least one interface between a certain package 20 and another package 20. The unloading operation determining section 640 estimates the length of at least one edge of the certain package 20 based on the detected interface information. The unloading operation determining section 640 estimates the size of the certain package 20 based on the information concerning the estimated length of the at least one side and the information concerning the size of each of the plurality of packages 20.

In this way, even in a case where a portion of a certain package 20 cannot be imaged or scanned by the three-dimensional camera 260, the unloading operation determining section 640 can narrow down the candidates for the size of the certain package 20 by using the information concerning the sizes of the plurality of packages 20. As a result, the unloading operation determining section 640 can estimate the overlapping state between the certain package 20 and other packages 20, based on the information indicating the estimated value of the size of the certain package 20 and the composite point group data or composite depth map.

This overlapping state may be indicated by a statistical value obtained by narrowing down the candidates for the size of the certain package 20. This statistical value is exemplified by a maximum value, a minimum value, an average value, a median value, a mode value, or the like. As an example, this overlapping state is indicated by at least one of a minimum value and a maximum value of an estimated value of the length of the overlapping portion between the certain package 20 and another package 20.

As an example, the unloading operation determining section 640 estimates the overlapping state between each of one or more packages 20 identified based on the information acquired by the three-dimensional camera 260 and other packages 20 located thereabove. The unloading operation determining section 640 may determine the package 20 to be the target of the unloading operation based on the overlapping state with the other packages 20. For example, the unloading operation determining section 640 determines the package 20 to be the target of the unloading operation such that packages 20 having less overlap with other packages 20 are prioritized to be the target of the unloading operation.

In a case where a package B is loaded on top of a package A, when the overlapping state between the package A and the package B is less than a predetermined amount, the unloading operation determining section 640 may make a determination to unload the package A before the package B, or to unload the package B before the package A. On the other hand, when the overlapping state between the package A and the package B is greater than a predetermined amount, the unloading operation determining section 640 makes a determination to unload the package B before the package A.

The unloading operation determining section 640 may determine the unloading direction of a certain package 20 based on the information indicating the overlapping state between this package 20 and another package 20 located above this package 20. When this overlapping state is less than a predetermined amount, the unloading operation determining section 640 may determine any direction to be the unloading direction of the certain package 20. On the other hand, when this overlapping state is greater than a predetermined amount, the unloading operation determining section 640 may determine the unloading direction of the certain package 20 to be a direction other than upward.

The unloading operation determining section 640 may determine a tolerance range or tolerance value for the angle formed between the unloading direction and the vertical direction, based on the overlapping state described above. The unloading operation determining section 640 may determine whether there is an unloading path in a case where a certain package 20 is to be withdrawn in a specified direction, based on the information indicating the overlapping state described above.

In another embodiment, the unloading operation determining section 640 evaluates a shadow at the interface between a certain package 20 and another package 20. The unloading operation determining section 640 may evaluate the shadow based on at least one of the shape of the shadow, the size of the shadow, and the darkness of the shadow. The unloading operation determining section 640 may determine at least one of the package 20 to be the target of the unloading operation and the unloading direction of the package 20, based on the evaluation relating to the shadow described above.

For example, the unloading operation determining section 640 analyzes an image captured by the three-dimensional camera 260 and recognizes a shadow occurring at the interface or the gap between a certain package 20 and another package 20. The shape, size, and darkness of this shadow changes according to the number and position of light sources, the size of the certain package 20, the size of the other package 20, and the positional relationship between the certain package 20 and the other package 20.

Therefore, the unloading operation determining section 640 may estimate the length of at least one side of the certain package 20 or the other package 20 based on at least one of the shape of the shadow, the size of the shadow, and the darkness of the shadow. The unloading operation determining section 640 may estimate the size of the certain package 20 based on the information concerning the estimated length of at least one size and the information concerning the sizes of the plurality of packages 20. Furthermore, the unloading operation determining section 640 may estimate the overlapping state between the certain package 20 and another package 20 based on at least one of the shape of the shadow, the size of the shadow, and the darkness of the shadow. The unloading operation determining section 640 may determine at least one of the package 20 to be the target of the unloading operation and the unloading direction of the package 20, using a procedure similar to the procedure described above.

As described above, elements considered when determining at least one of the package 20 to be the target of the unloading operation and the unloading direction of the package 20 are exemplified by (i) the positional relationship between the plurality of stacked packages 20, (ii) the sizes of the plurality of packages 20, (iii) the results of an analysis of the information obtained by imaging or scanning the inside of the container 22 with the three-dimensional camera 260 (e.g. the point group data or the composite depth map), (iv) the results of an analysis of the image obtained by imaging the inside of the container 22 with the three-dimensional camera 260 (e.g. the evaluation results of the shadow), (v) the overlapping state between a certain package 20 and another package 20, (vi) the certainty of the determination result relating to the presence or lack of an unloading path, and (vii) the time needed for the unloading operation. The unloading operation determining section 640 may determine at least one of the package 20 to be the target of the unloading operation and the unloading direction of the package 20 based on a combination of two or more of these considered elements.

In the present embodiment, the robot control section 650 controls the manipulator 220. For example, the robot control section 650 controls the manipulator 220 to unload the package 20 determined by the unloading operation determining section 640 from among the plurality of packages 20 and arrange this package 20 on the conveyor 270. The robot control section 650 may determine the trajectory of the robot hand 222 to realize the operation described above. The robot control section 650 may generate a command indicating the trajectory of the robot hand 222, and transmit this command to the drive control section 250.

In the present embodiment, the storage section 660 stores various pieces of information. For example, the storage section 660 may acquire the information concerning the sizes of the plurality of packages 20 loaded in the container 22 from the management server 160, and store this information. The storage section 660 may acquire from the management server 160 the information concerning feature points of the plurality of packages 20 loaded in the container 22, and store this information.

Figure 7:
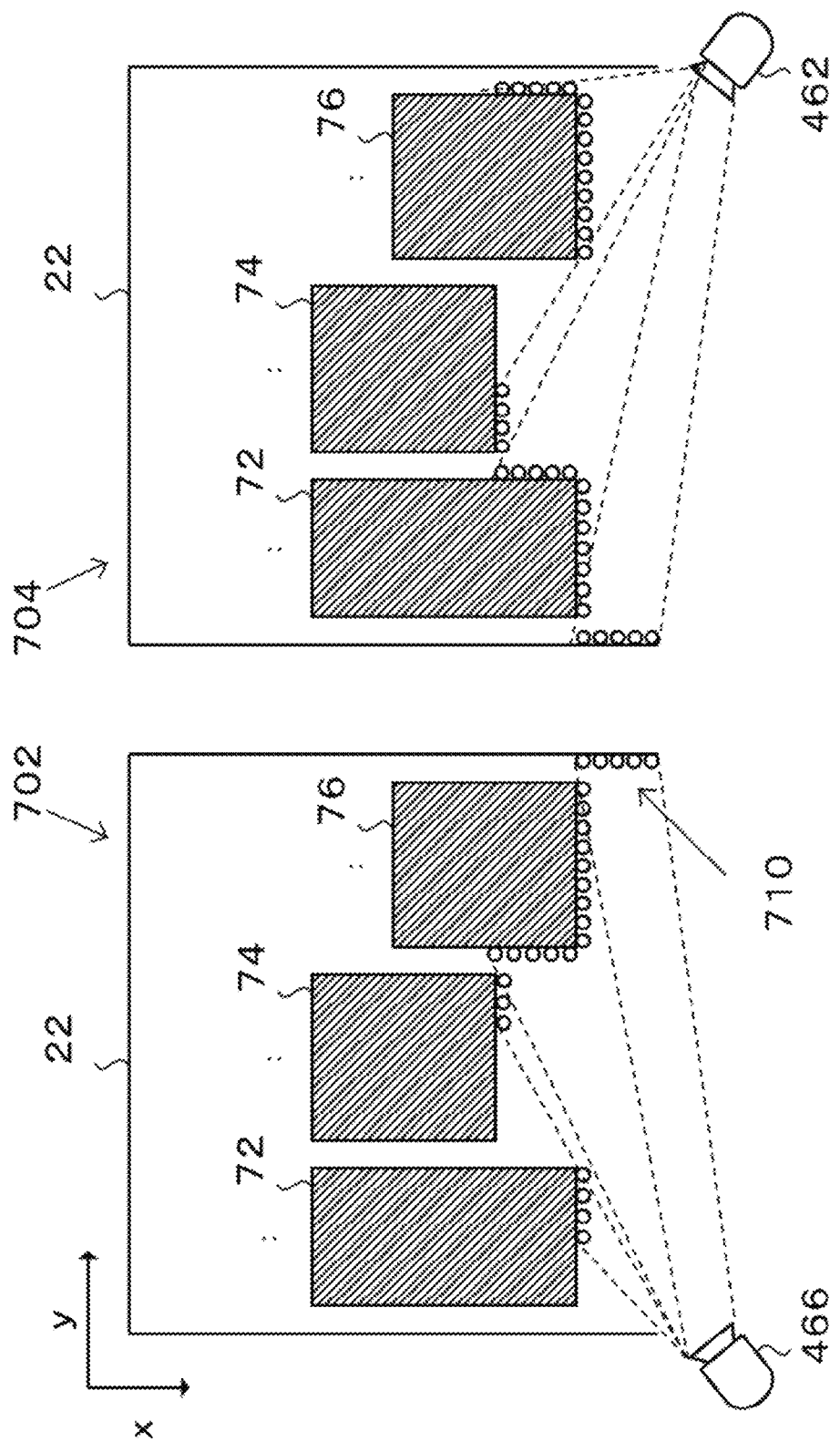
FIG. 7 schematically shows an example of point group data.
Figure 8:
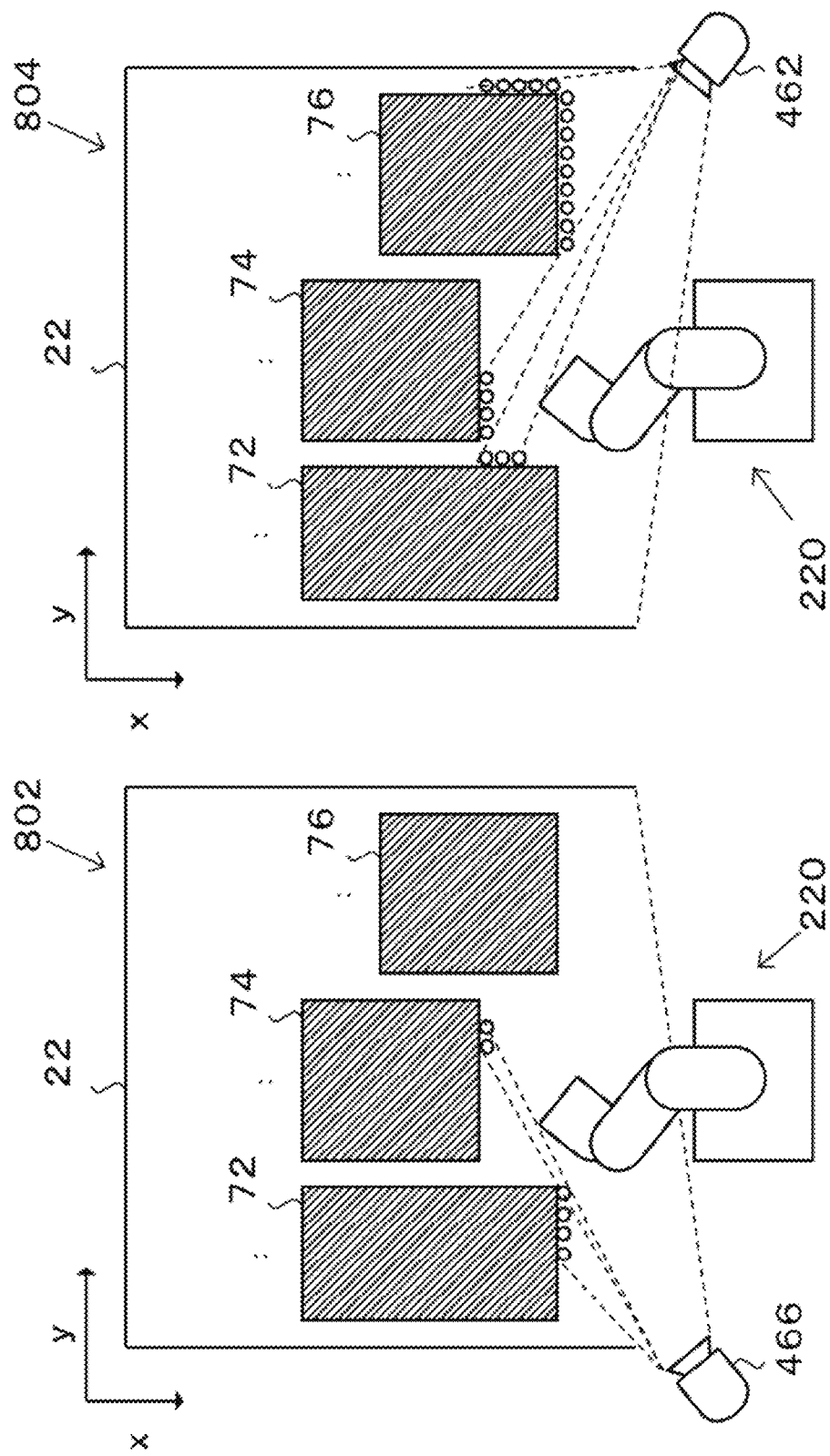
FIG. 8 schematically shows an example of point group data.
Figure 9:
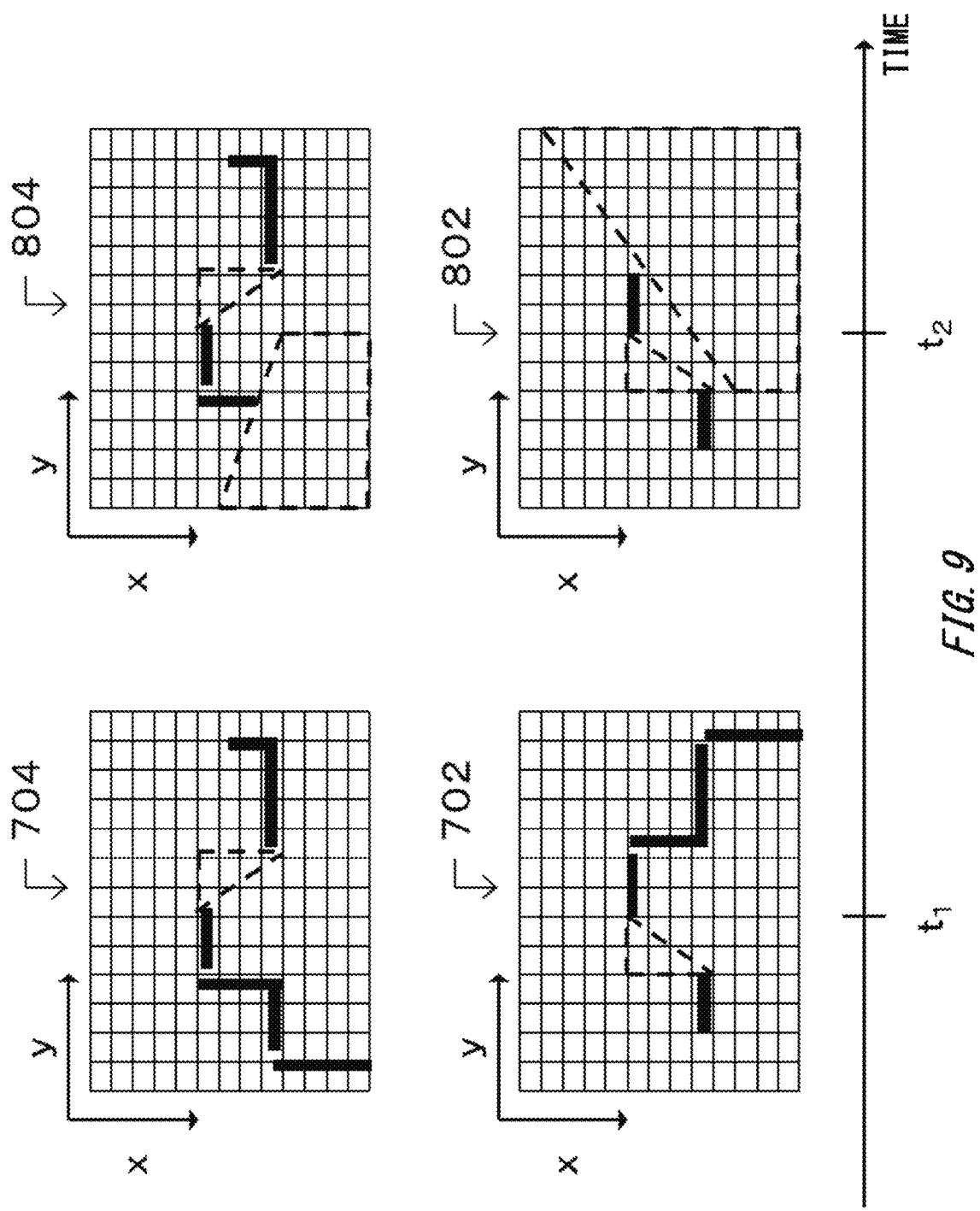
FIG. 9 schematically shows an example of point group data.

The point group data is described using FIGS. 7, 8, and 9. FIGS. 7 and 8 schematically show examples of the point group data at a specified height position. FIG. 7 shows an example of a case where the manipulator 220 is not in the viewing angles of the cameras. FIG. 8 shows an example where the manipulator 220 is in the viewing angles of the cameras. FIG. 9 schematically shows examples of the point group data at a plurality of time points.

FIG. 7 shows point group data 702 acquired by the three-dimensional camera 466, along with a package 72, a package 74, and a package 76 arranged inside the container 22. Similarly, FIG. 7 also shows point group data 704 acquired by the three-dimensional camera 462, along with the package 72, the package 74, and the package 76 arranged inside the container 22. In FIG. 7, the small circles 710 indicate the points forming the point groups. As shown in FIG. 7, there are regions where the point groups cannot be acquired by a single three-dimensional camera, due to the unevenness of the plurality of packages.

FIG. 8 shows point group data 802 acquired by the three-dimensional camera 466, along with the package 72, the package 74, and the package 76 arranged inside the container 22 and the manipulator 220. Similarly, FIG. 8 also shows point group data 804 acquired by the three-dimensional camera 462, along with the package 72, the package 74, and the package 76 arranged inside the container 22 and the manipulator 220. As shown in FIG. 8, there are regions where the point groups cannot be acquired by a single three-dimensional camera, due to the manipulator 220 intruding into the viewing angles of the three-dimensional cameras.

FIG. 9 shows the acquisition of the point group data 702 by the three-dimensional camera 466 and the acquisition of the point group data 704 by the three-dimensional camera 462 at the timing t1. Similarly, FIG. 9 also shows the acquisition of the point group data 802 by the three-dimensional camera 466 and the acquisition of the point group data 804 by the three-dimensional camera 462 at the timing t2. In FIG. 9, the thick lines indicate the point groups. In FIG. 9, the regions surrounded by dashed lines indicate regions where it is unknown whether point groups corresponding to a portion of a surface of the package 20 are present.

Figure 10:
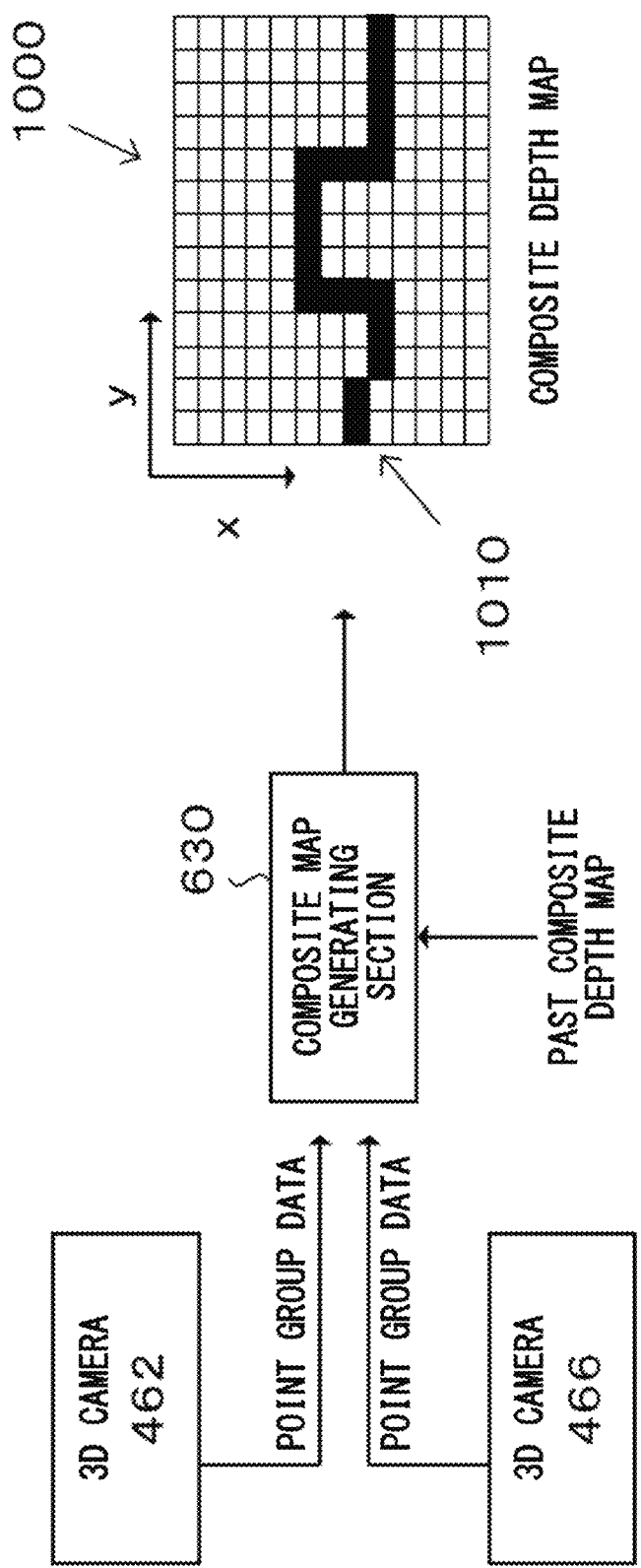
FIG. 10 schematically shows an example of information processing by the composite map generating section 630.

FIG. 10 schematically shows an example of information in the composite map generating section 630. As described above, the composite map generating section 630 acquires the point group data acquired by the three-dimensional camera 462 from the three-dimensional camera 462. Similarly, the composite map generating section 630 acquires the point group data acquired by the three-dimensional camera 466 from the three-dimensional camera 466.

The composite map generating section 630 generates the composite depth map 1000 based on the point group data acquired by the three-dimensional camera 462 and the point group data acquired by the three-dimensional camera 466. The composite map generating section 630 may generate the composite depth map 1000 based on the point group data acquired by the three-dimensional camera 462 at one or more time points and the point group data acquired by the three-dimensional camera 466 at one or more time points. The surface shapes 1010 of the plurality of packages 20 are obtained by connecting together a plurality of voxels that contain the "occupied" information in the composite depth map 1000.

FIG. 11 schematically shows an example of a data table 1100. In the present embodiment, the data table 1100 may be an example of the first depth map, the second depth map, and the composite depth map. In the present embodiment, the data table 1100 stores voxel IDs 1120 for identifying each voxel, information 1140 concerning the point groups relating to each voxel, and information 1160 indicating a merging result in association with each other.

In the present embodiment, the information 1140 concerning the point groups relating to each voxel may include a camera ID identifying the three-dimensional camera that captured the point group, information indicating the timing at which the point group was acquired, and information indicating an evaluation of the voxel determined based on the point group. The information indicating the evaluation of the voxel is exemplified by the "occupied" information, the "empty" information, and the "unknown" information.

The data table of the composite depth map may store the voxel ID 1120 and the information 1160 indicating the merging result in association with each other. The data table of the first depth map and the second depth map may store the voxel ID 1120 and the point group information 1140 in association with each other.

Figure 12:
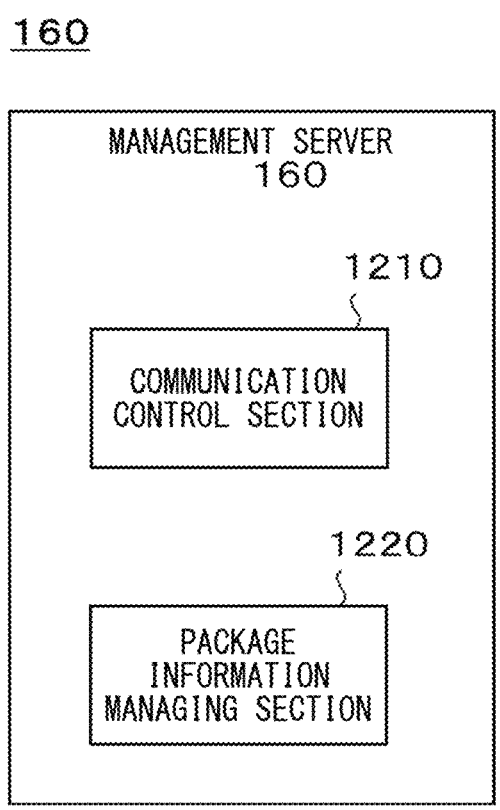
FIG. 12 schematically shows an example of an internal configuration of the management server 160.

FIG. 12 schematically shows an example of an internal configuration of the management server 160. In the present embodiment, the management server 160 includes a communication control section 1210 and a package information managing section 1220.

In the present embodiment, the communication control section 1210 controls the communication between the management server 160 and at least one of the vanning system 120 and the devanning system 140. The communication control section 1210 may be a communication interface.

In the present embodiment, the package information managing section 1220 manages the information concerning each of the plurality of packages 20 loaded in the truck 12. For example, the package information managing section 1220 acquires the information concerning the size of each of the plurality of packages 20 loaded in the truck 12, from the vanning system 120. The package information managing section 1220 may acquire the information concerning the feature points of each of the plurality of packages 20 loaded in the truck 12, from the vanning system 120. The package information managing section 1220 may acquire the information concerning the mass of each of the plurality of packages 20 loaded in the truck 12, from the vanning system 120. The package information managing section 1220 may store the various pieces of information concerning the cargo of the truck 12, in the storage apparatus. The package information managing section 1220 may transmit the information concerning the cargo of the truck 12 to the devanning system 140 in response to a request from the devanning system 140, for example.

FIG. 13 schematically shows an example of a data table 1300. In the present embodiment, the data table 1300 may be an example of the information concerning the cargo of the truck 12. In the present embodiment, the data table 1300 stores container IDs 1320 for identifying the container into which each package is loaded, package IDs 1330 for identifying each package, information 1340 concerning the size of each package, information 1350 concerning the shape of each package, and information 1360 concerning the feature points of each package in association with each other. The information 1360 concerning the feature points of each package may be the URI of electronic data indicating the feature points of each package.

While the embodiments of the present invention have been described, the technical scope of the invention is not limited to the above described embodiments. It is apparent to persons skilled in the art that various alterations and improvements can be added to the above-described embodiments. It is also possible to apply the ideas described for a certain embodiment to another embodiment, as long as this does not cause a technical contradiction. Each configurational element may have the same features as another configurational element that has the same name but a different reference number. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A control apparatus comprising:
   a first information acquiring section for acquiring three-dimensional information of a first region of surfaces of a plurality of objects that are stacked, the information being obtained by imaging or scanning the plurality of objects from a first location;
   a second information acquiring section for acquiring three-dimensional information of a second region of surfaces of the plurality of objects, the information being obtained by imaging or scanning the plurality of objects from a second location; and
   a combining section for generating information representing three-dimensional shapes of at least a portion of the surfaces of the plurality of objects, based on the three-dimensional information of the first region acquired by the first information acquiring section and the three-dimensional information of the second region acquired by the second information acquiring section, wherein
   a position of the first location and a position of the second location are different from each other, and
   the combining section
      generates the information representing the three-dimensional shapes of at least a portion of the surfaces of the plurality of objects by complementing one of the three-dimensional information of the first region and the three-dimensional information of the second region with the other,
      removes information concerning a surface of the manipulator from the three-dimensional information of the first region acquired by the first information acquiring section,
      removes information concerning the surface of the manipulator from the three-dimensional information of the second region acquired by the second information acquiring section, and
      generates the information representing the three-dimensional shapes of at least a portion of the surfaces of the plurality of objects by complementing one of the three-dimensional information of the first region and the three-dimensional information of the second region, from which the information concerning the surface of the manipulator has been removed, with the other.

2. The control apparatus of claim 1, wherein the information representing the three-dimensional shapes generated by the combining section is used for controlling the manipulator for unloading at least one object among a plurality of objects that are stacked.

3. The control apparatus according to claim 2, further comprising:
   an unloading target determining section for determining the object to be a target of an unloading operation by the manipulator.

4. The control apparatus according to claim 3, further comprising:
   an unloading direction determining section for determining an unloading direction of the object determined by the unloading target determining section.

5. The control apparatus according to claim 2, wherein the combining section:
   generates first map information in which, for each of a plurality of voxels set virtually in a work space of the robot, (a) "occupied" information representing that a portion of a surface of an object among the plurality of objects is present in the voxel, (b) "empty" information representing that no surfaces of the plurality of objects are present in the voxel, or (c) "unknown" information representing that it is unknown whether a portion of a surface of an object among the plurality of objects is present in the voxel is associated with the voxel, based on the three-dimensional information of the first region acquired by the first information acquiring section,
   generates second map information in which, for each of the plurality of voxels, (a) the "occupied" information, (b) the "empty" information, or (c) the "unknown" information is associated with the voxel, based on the three-dimensional information of the second region acquired by the second information acquiring section, and generates composite map information in which, for each of the plurality of voxels, (a) the "occupied" information, (b) the "empty" information, or (c) the "unknown" information is associated with the voxel, by complementing one of the first map information and the second map information with the other.

6. The control apparatus according to claim 5, wherein the combining section generates the first map information based on the three-dimensional information of the first region, at a plurality of time points, acquired by the first information acquiring section.

7. The control apparatus according to claim 5, wherein the combining section generates the second map information based on the three-dimensional information of the second region, at a plurality of time points, acquired by the second information acquiring section.

8. The control apparatus according to claim 5, wherein the combining section:

generates the first map information based on the three-dimensional information of the first region, at one or more time points, acquired by the first information acquiring section, generates the second map information based on the three-dimensional information of the second region, at one or more time points, acquired by the second information acquiring section, and in a case where the first map information and the second map information are different for the same voxel, (i) generates the composite map information using temporally newer information or (ii) generates the composite map information using the information obtained by the information acquiring section closer to an installation position of the manipulator.

9. A non-transitory computer-readable medium having processor instructions stored thereon that, when executed cause a processor to perform operations for controlling a robot for unloading at least one object among a plurality of objects that are stacked, using a manipulator, comprising:

a first information acquiring step of acquiring three-dimensional information of a first region of surfaces of the plurality of objects, the information being obtained by imaging or scanning the plurality of objects from a first location;

a second information acquiring step of acquiring three-dimensional information of a second region of surfaces of the plurality of objects, the information being obtained by imaging or scanning the plurality of objects from a second location; and a combining step of generating information representing three-dimensional shapes of at least a portion of the surfaces of the plurality of objects, based on the three-dimensional information of the first region acquired in the first information acquiring step and the three-dimensional information of the second region acquired in the second information acquiring step, wherein a position of the first location and a position of the second location are different from each other, and the combining step includes generating the information representing the three-dimensional shapes of at least a portion of the surfaces of the plurality of objects by complementing one of the three-dimensional information of the first region and the three-dimensional information of the second region with the other, removing information concerning a surface of the manipulator from the three-dimensional information of the first region acquired by the first information acquiring section, removing information concerning the surface of the manipulator from the three-dimensional information of the second region acquired by the second information acquiring section, and generating the information representing the three-dimensional shapes of at least a portion of the surfaces of the plurality of objects by complementing one of the three-dimensional information of the first region and the three-dimensional information of the second region, from which the information concerning the surface of the manipulator has been removed, with the other.

10. A control method for controlling a robot for unloading at least one object among a plurality of objects that are stacked, using a manipulator, the control method comprising:

a first information acquiring step of acquiring three-dimensional information of a first region of surfaces of the plurality of objects, the information being obtained by imaging or scanning the plurality of objects from a first location;

a second information acquiring step of acquiring three-dimensional information of a second region of surfaces of the plurality of objects, the information being obtained by imaging or scanning the plurality of objects from a second location; and a combining step of generating information representing three-dimensional shapes of at least a portion of the surfaces of the plurality of objects, based on the three-dimensional information of the first region acquired in the first information acquiring step and the three-dimensional information of the second region acquired in the second information acquiring step, wherein a position of the first location and a position of the second location are different from each other, and the combining step includes generating the information representing the three-dimensional shapes of at least a portion of the surfaces of the plurality of objects by complementing one of the three-dimensional information of the first region and the three-dimensional information of the second region with the other, removing information concerning a surface of the manipulator from the three-dimensional information of the first region acquired by the first information acquiring section, removing information concerning the surface of the manipulator from the three-dimensional information of the second region acquired by the second information acquiring section, and generating the information representing the three-dimensional shapes of at least a portion of the surfaces of the plurality of objects by complementing one of the three-dimensional information of the first region and the three-dimensional information of the second region, from which the information concerning the surface of the manipulator has been removed, with the other.

* * * * *